United States Patent [19]

Leigh-Monstevens et al.

[11] Patent Number: 4,687,084

[45] Date of Patent: Aug. 18, 1987

[54] CLUTCH RELEASE APPARATUS FOR PULL TYPE CLUTCHES

[75] Inventors: Keith V. Leigh-Monstevens, Troy; David L. Wrobleski, Fraser; Richard A. Nix, Utica; Mark W. Rei, Royal Oak, all of Mich.

[73] Assignee: Automotive Products plc, Warwickshire, England

[21] Appl. No.: 757,799

[22] Filed: Jul. 22, 1985

[51] Int. Cl.[4] .................... F16D 25/08; F16D 23/14
[52] U.S. Cl. ........................ 192/85 CA; 192/70.13; 192/91 A; 192/98; 192/DIG. 1; 403/341; 403/364
[58] Field of Search ............... 192/98, 110 B, 85 CA, 192/91 A, 70.13, DIG. 1; 403/341, 364

[56] References Cited

U.S. PATENT DOCUMENTS

| | | | |
|---|---|---|---|
| 2,710,763 | 6/1955 | Gilbert | 403/364 |
| 3,191,453 | 6/1965 | Hoven | 403/364 |
| 3,912,058 | 10/1975 | Parkins | 192/91 A X |
| 3,955,660 | 5/1976 | Poon et al. | 192/91 A |
| 4,344,516 | 8/1982 | Kolb | 192/85 CA X |
| 4,399,898 | 8/1983 | Olschewski et al. | 192/98 |
| 4,456,111 | 6/1984 | Limbacher | 192/85 CA |
| 4,502,583 | 3/1985 | Limbacher | 192/98 |
| 4,529,075 | 7/1985 | Renaud | 192/98 |
| 4,585,109 | 4/1986 | Shirley et al. | 192/85 CA |

FOREIGN PATENT DOCUMENTS

| | | | |
|---|---|---|---|
| 2815971 | 10/1979 | Fed. Rep. of Germany | 192/98 |
| 2304826 | 10/1976 | France | 192/98 |
| 2098697 | 11/1982 | United Kingdom | 192/70.13 |

*Primary Examiner*—Rodney H. Bonck
*Assistant Examiner*—Richard M. Lorence
*Attorney, Agent, or Firm*—Hauke & Patalidis

[57] ABSTRACT

A bearing carrier for a pull-type clutch, and which forms part of the clutch mechanism assembly, has a crenellated rim provided with longitudinally projecting tooth-like portions, cut-out portions being provided between consecutive projecting portions. A separate tubular member, forming part of the clutch control mechanism, has a correspondingly crenellated rim provided with longitudinally projecting portions and cut-out portions between consecutive projecting portions. One of the crenellated rims has a peripheral groove in which is disposed an expandable resilient ring, and the other crenellated rim has a corresponding peripheral groove and is provided at the leading edge of its projecting portion with a ramp for expanding the ring when the one of the crenellated rims is pushed into the other crenellated rim for coupling the bearing carrier with the tubular member during assembly of the bearing carrier with the tubular member. The clutch control mechanism is preferably an annular hydraulic cylinder having an annular piston attached to the other end of the tubular member. The annular cylinder, installed within the bell housing of the clutch mechanism, is connected to the master cylinder via a connector or a connection block fastened through an opening in the bell housing. The annular cylinder is connected to the connector or the connection block through a conduit disposed within the bell housing. A second conduit provided at an end with a complementary leak-proof connector member connects the connector or the connection block to the master cylinder.

25 Claims, 10 Drawing Figures

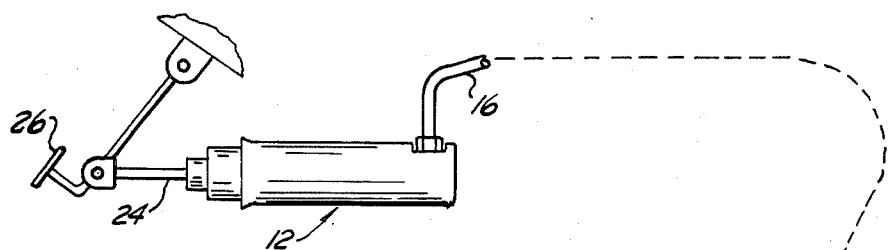
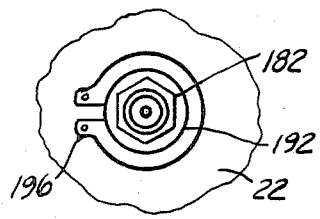
FIG. 10
FIG. 8
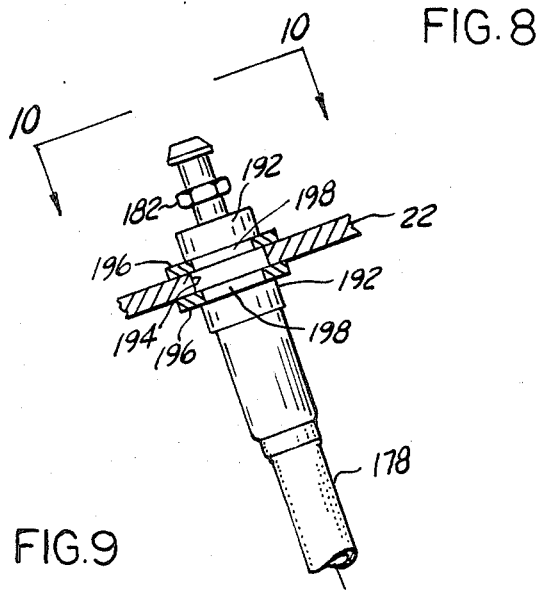
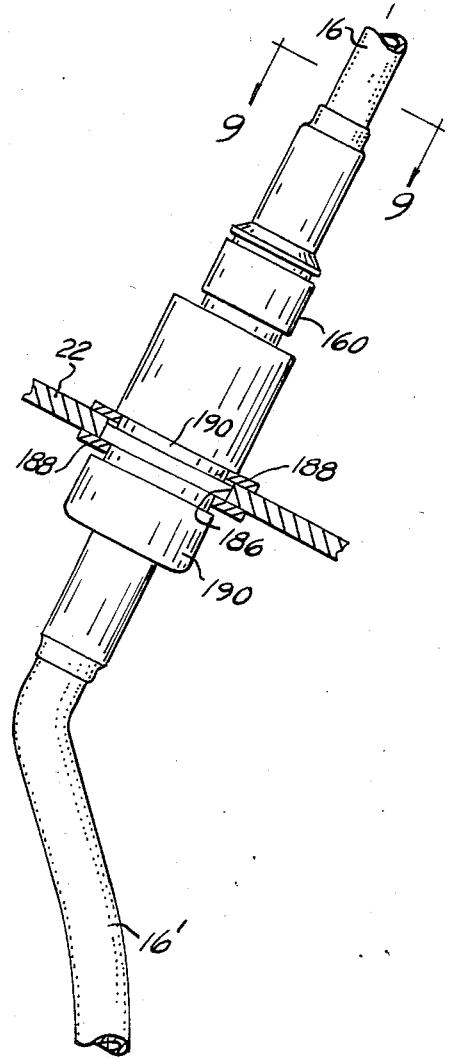
FIG. 9
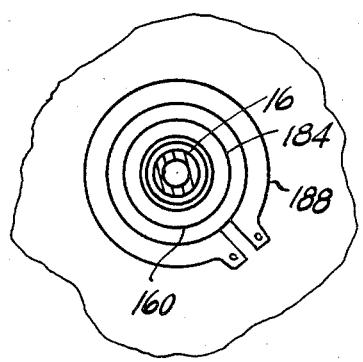
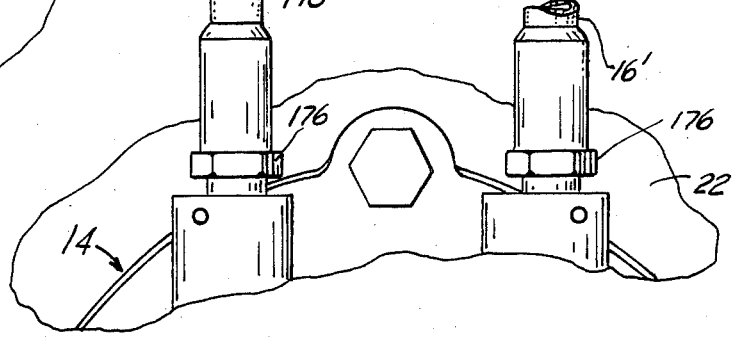

CLUTCH RELEASE APPARATUS FOR PULL TYPE CLUTCHES

BACKGROUND OF THE INVENTION

The present invention relates to a control apparatus for motor vehicle mechanical clutches in general, and more particularly to a hydraulic control apparatus for operating pull type clutches and to a structure for coupling the clutch release bearing to a clutch operating member.

Hydraulic apparatus for remotely controlling the operation of a motor vehicle mechanical clutch, such as a disk clutch for example, consist of a master cylinder having an input member mechanically connected to the driver operated clutch pedal, the master cylinder output being hydraulically connected by a conduit to the input of a remotely located slave cylinder operating the clutch release mechanism. The slave cylinder often takes the form of an annular cylinder installed peripherally around the driveshaft driving the input of the transmission or gearbox from the clutch mechanism. Such apparatus are well known, as for example disclosed in U.S. Pat. Nos. 4,585,106, 4,585,107, 4,585,108, 4,585,109 and 4,609,087 and in U.S. patent application Ser. No. 537,869, filed Sept. 30, 1983, all assigned to the same assignee as the present application.

The slave cylinders of such hydraulic apparatus are provided with an annular piston having an end disposed in the annular cylinder and another end supporting, or connected to the clutch throw-out bearing. Slave cylinders for operating clutches of the push type are generally of the push type. Hydraulic fluid supplied from the master cylinder, is introduced in the slave cylinder in a chamber between the piston head and an end of the slave cylinder to displace the piston, and therefore the clutch throw-out bearing, in a direction toward the clutch mechanism, causing the revolving race of the throw-out bearing engaged with the end of the clutch release fingers to push against the finger ends for releasing the clutch. Some clutch mechanisms are designed with a leverage arrangement that requires that a pull away from the clutch mechanism be exerted on the end of the finger for displacing the clutch pressure plate away from the clutch disk plate. A pull type slave cylinder is required for operating such clutch mechanism, having a structure which, when hydraulic fluid is supplied to the slave cylinder from the master cylinder, causes displacement of the piston in the direction causing the revolving race of the throw-out bearing to pull, rather than push, on the end of the clutch release fingers. One problem involved with such a structure is that the throw-out bearing thus forms part of the clutch assembly, as it must be installed behind the clutch release fingers, with the inconvenience that the throw-out bearing must be attached, in some manner, to the end of the annular piston projecting from the end of the annular cylinder, during assembly of the motor vehicle on the assembly line.

SUMMARY OF THE INVENTION

The present invention has for principal object to provide the carrier of a clutch release bearing incorporated in the clutch assembly with appropriate coupling means for attaching the bearing carrier, on a motor vehicle assembly line to a clutch release mechanism, such as the piston of a hydraulic slave cylinder. Another object of the invention is to provide a pull type hydraulic slave cylinder with a disposable assembly spacer installed as part of the slave cylinder assembly for maintaining the piston in an appropriate position during filling of the hydraulic apparatus with hydraulic fluid, during shipment to a motor vehicle manufacturer and to facilitate assembly of the slave cylinder piston end with the release or throw-out, bearing carrier during assembly of the motor vehicle.

A further object of the invention is to provide such a pull type slave cylinder as a separate subassembly that can be installed within the clutch bell housing and is connectable to the master cylinder by a conduit having a quick-connect connector on one end securedly engageable with an appropriate complementary connector installed through the wall of the clutch bell housing.

Other objects and advantages of the present invention will become apparent to those skilled in the art when the following description of the best mode contemplated for practicing the invention is read in conjunction with the accompanying drawing, and in which:

BRIEF DESCRIPTION OF THE DRAWINGS

FIG. 7 is a view from line 7—7 of FIG. 1;

FIG. 8 is a partial view similar to FIG. 1 but showing a modification thereof; and FIGS. 9 and 10 are views respectively from line 9—9 and 10—10 of FIG. 8.

DETAILED DESCRIPTION OF THE PREFERRED EMBODIMENTS

Figure 1:
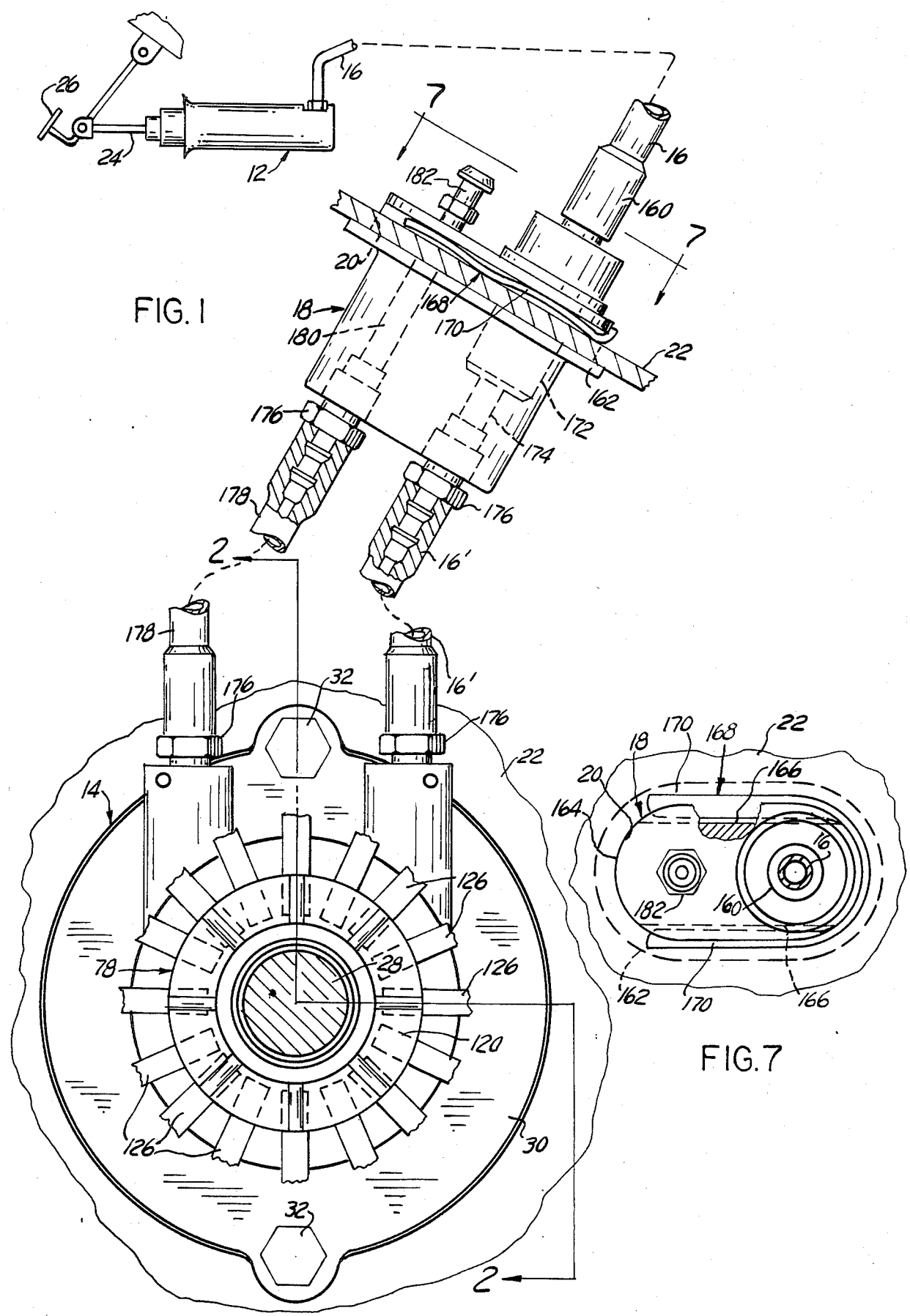
FIG. 1 is a schematic broken view of a clutch release hydraulic apparatus according to the present invention, and illustrating the slave cylinder portion thereof as seen from behind the clutch diaphragm release fingers.

Referring to FIG. 1 of the drawing, a hydraulic apparatus for operating a motor vehicle mechanical clutch, such as a disk clutch, not shown, is illustrated as comprising a master cylinder 12 in hydraulic fluid communication with a slave cylinder 14 via a flexible conduit 16. The master cylinder 12 may be directly connected by the conduit 16 to the slave cylinder 14 or, as illustrated, through the intermediary of a connection block 18 installed through an opening 20 in the motor vehicle clutch bell housing 22, as will be explained hereinafter in further detail.

The master cylinder 12 has an input member or rod 24 operable by the motor vehicle clutch release pedal 26. A piston, not shown, is attached to the end of the input rod 24 with the result that displacement of the input rod 24, to the right as seen in the drawing, causes transfer of hydraulic fluid from the master cylinder 12 to the slave cylinder 14 through the line or conduit 16 either directly in some structure, or in the example of structure illustrated through a line 16' connecting the outlet of the connection block 18 to the inlet of the slave cylinder 14.

Figure 2:
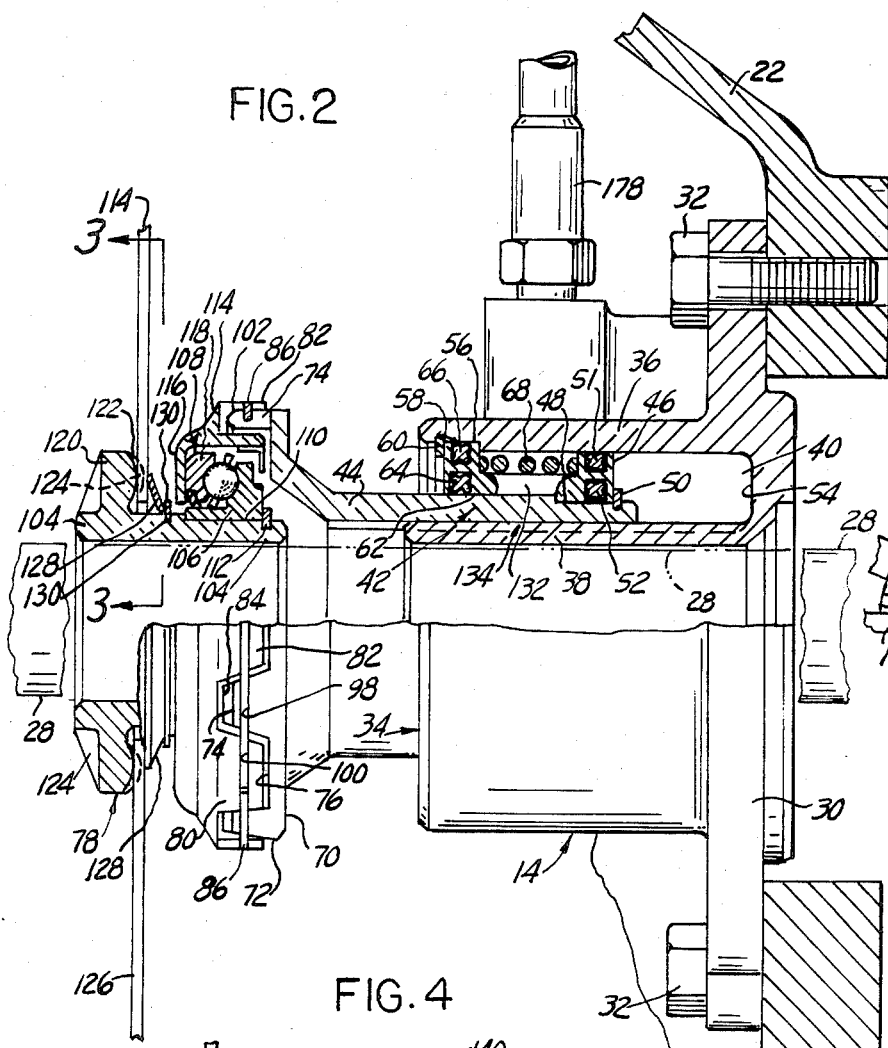
FIG. 2 is a partial longitudinal section and side elevation view as seen from line 2—2 of FIG. 1.
Figure 3:
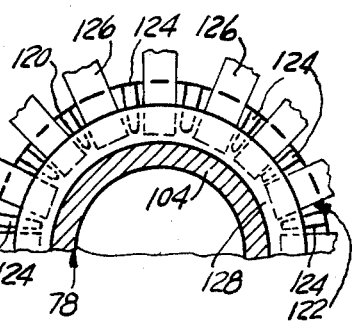
FIG. 3. is a partial view thereof from line 3—3 of FIG. 2.

As shown at FIGS. 1 and 2, the slave cylinder 14 is annular and disposed around the driveshaft 28 between the clutch, not shown, and the transmission or gearbox, not shown. The slave cylinder 14 has a mounting flange 30 on one end for bolting to an end plate of the transmission housing or, alternatively and as shown, for bolting to the transmission end of the clutch bell housing 22 by way of mounting bolts 32. The slave cylinder 14 is made of a single casting or molding forming a housing 34 having an outer tubular wall 36 disposed concentric and spaced apart from an inner tubular wall 38 and defining an annular chamber 40 therebetween. Alternatively, the slave cylinder 14 may be made of two tubular members coaxially disposed and attached together.

A generally annular piston 42 is reciprocably disposed within the annular chamber 40. The piston 42 has a tubular body member or sleeve 44, slidably disposed over the cylinder inner tubular wall 38, carrying an annular piston head 46 on one end. In the structure illustrated, the piston head 46 is fitted over a reduced outer diameter end portion 48 of the piston sleeve 44 and held there by means of a snap ring 50 engaged in an appropriate groove at the extreme end of the piston sleeve 44. A pair of elastomeric quad rings 51 and 52, disposed in appropriate grooves in the annular piston head 46, prevent leakage of fluid past the annular piston head 46.

The slave cylinder annular chamber 40 is closed at one end, as shown at 54 and has an open end directed toward the clutch, which is provided with an annular end seal 56 held in an enlarged diameter end bore portion 58 of the housing 34 by way of a snap ring 60 engaged in an internal groove. The piston sleeve 44 slides through the central circular bore 62 of the end ring 56, which is provided with an appropriate elastomeric seal 64 installed in an appropriate internal groove, the periphery of the end ring 56 being also provided with an elastomeric ring 66 disposed in a corresponding peripheral groove. A compressed coil spring 68 is disposed between the end ring 56 and the back of the piston annular head 46, such as to constantly exert a preload force on the piston 42 tending to displace it in the annular chamber 40 towards the closed end 54.

The portion of the chamber 40 between the cylinder closed end 54 and the piston head 46 is vented to atmosphere to prevent compressing air behind the piston head 46 during reciprocation of the piston 42. The piston sleeve 44 terminates in a outwardly projecting flange 70 having an integral crenellated rim 72. The crenellated rim 72 has teeth-like projecting portions 74 which are separated by cut-out portions 76. A bearing carrier 78 is attached to the crenellated rim 72 of the piston sleeve 44 by having a complementary crenellated rim 80 provided with tooth-like portions 82 projecting within the cut-out portions 76 of the piston sleeve crenellated rim 72 and cut-out portions 84 into which project the tooth-like portions 74 of the piston sleeve crenellated rim 72. A spring snap ring 86 is disposed in a peripheral groove 98 in the tooth-like portions 74 of the piston sleeve crenellated rim 72, and in a corresponding groove 100 in the tooth-like projecting portions 82 of the crenellated rim 80 of the bearing carrier 78 for coupling the bearing carrier 78 to the end of the piston sleeve 44. The leading edge of each projecting portion 74 of the piston sleeve crenellated rim 72 is tapered such as to form a ramp 102. When the bearing carrier 78 is pushed towards the slave cylinder piston sleeve each ramp 102 at the leading edge of each projecting portion 74 of the piston sleeve crenellated rim 72 deflects the snap ring 86 outwardly, FIGS. 4–5, causing the inner edge of the ring 86 to ride on the ramps 102 until it elastically snaps into the groove 98, thus coupling the bearing carrier 78 onto the end of the piston sleeve 44.

The bearing carrier 78 has a generally tubular body 104, such as to clear the periphery of the driveshaft 28, supporting on its end coupled to the end of the slave cylinder piston sleeve 44 the inner race 106 of a thrust ball bearing 108 press-fitted over a reduced diameter portion 110, and further held in position by means of a spring snap ring 112. The ball bearing 108 is peripherally covered by a housing 114 having a radially disposed wall 116 in engagement with the end face of the ball bearing outer race 118. The peripheral portion of the ball bearing housing 114 forms the crenellated rim 80 of the bearing carrier 78.

The bearing carrier tubular body 104 has a flange 120 on its other end which has a curved face 122 on its side disposed toward the ball bearing 108. Portions of the flange curved face 122 are separated by ribs 124, and the end of the clutch release levers or, as illustrated, the end of each clutch diaphragm spring finger 126 is in engagement with a portion of the curved face 122 of the flange 120 between consecutive separation ribs 124. The ends of the fingers 126 are held by means of a dished spring 128, of the Belleville type, in turn held in position and pre-stressed by a snap ring 130.

In order to release the clutch, the slave cylinder piston 42 is displaced within the slave cylinder chamber 40 to the right, as seen at FIG. 2, as a result of introducing in an annular chamber 132 between the piston head 46 and the cylinder end sealing ring 56 hydraulic fluid displaced from the master cylinder 12, through the conduit 16, the connecting means 18 and the conduit 16'. The chamber 132 has a port, not shown, placing it in communication with the conduit 16'. Once the slave cylinder piston 44 has been displaced to the right, as seen at FIG. 2, to the end of its stroke, thus pulling with it the bearing carrier 78, and pulling to the right the end of the clutch release fingers 126, the clutch, not shown, is fully released. When fluid is removed from the chamber 132, as a result of releasing the clutch pedal 26, FIG. 1, the spring force exerted by the clutch diaphragm spring and applied to the end of the fingers 126 return the bearing carrier 78 to its original position of clutch engagement, thus pulling with it the piston sleeve 44. The coil spring 68 constantly exerts a preload, transmitted through the piston sleeve 44 and the bearing carrier 78 to the end of the diaphragm fingers 126. It is to be noted that the bearing carrier 78 is caused to constantly rotate whether the clutch is engaged or not, as long as the motor vehicle engine is running, thus causing rotation of the ball bearing inner race 106, while the ball bearing outer race 118 is non-rotating as being frictionally engaged with the end wall 116 of the housing 114 which is coupled through its crenellated rim 80 to the crenellated rim 72 of the piston sleeve 44. The piston sleeve 44 is in turn prevented from rotating relative to the slave cylinder housing 34 by being provided on its internal surface with appropriate longitudinal grooves engaged with appropriate longitudinal ribs formed on the periphery of the internal surface of the cylinder wall 38, or vice-versa, forming a longitudinally sliding spline coupling generally designated at 134 of FIG. 2, allowing relative longitudinal motion but preventing relative rotary motion between the piston 42 and the slave cylinder housing 34. The spline coupling 134 also forms a convenient arrangement for venting to atmosphere the portion of the cylinder chamber 40 between the piston head 46 and the cylinder closed end 54.

The outer race 118 of the ball bearing 108 being only frictionally engaged with the internal surface of the end wall 116 of the housing 114 is free for radial motion, thus permitting the ball bearing 108 to self-align radially, carrying with it the bearing carrier 78 and aligning the axis of rotation of the bearing carrier with the axis of rotation of the clutch.

As previously mentioned, the bearing carrier 78 forms part of the clutch assembly. After the parts forming the master cylinder 12 have been fully assembled, the parts forming the slave cylinder 14 have been fully assembled, and the master cylinder 12 and the slave cylinder 14 have been connected by the conduit 16 either directly, or through the intermediary of the connection block 18, FIG. 1, and the intermediary conduit 16', the whole apparatus is filled with hydraulic fluid prior to shipment to a motor vehicle manufacturer for installation on a motor vehicle, by any one of the methods disclosed in U.S. Pat. No. 4,407,125 and in co-pending application Ser. Nos. 376,248, 5/10/82, 555,667, 11/28/83, 607,020, 4/30/84, all assigned to the same assignee as the present application. On the motor vehicle manufacturer assembly line, the master cylinder 12 is installed through the bulkhead between the driver compartment and the engine compartment, and the slave cylinder 14 is installed over the driveshaft between the clutch and the transmission, for example by being attached by way of its mounting flange 30 to the transmission end of the clutch bell housing 22.

Figure 4:
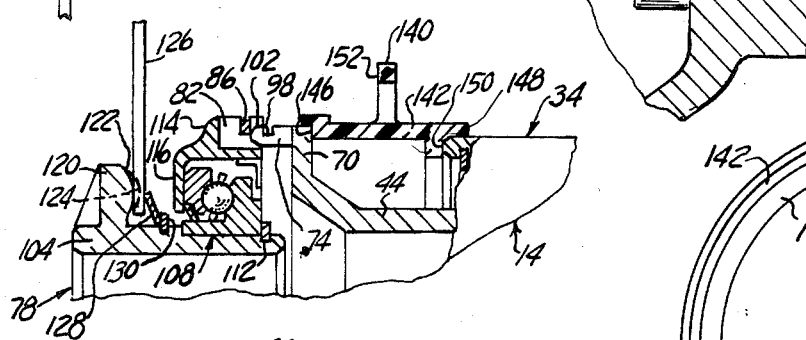
FIGS. 4 and 5 are partial views illustrating intermediary steps in the course of connecting the slave cylinder assembly to the bearing carrier assembly during installation of the apparatus on the motor vehicle.
Figure 6:
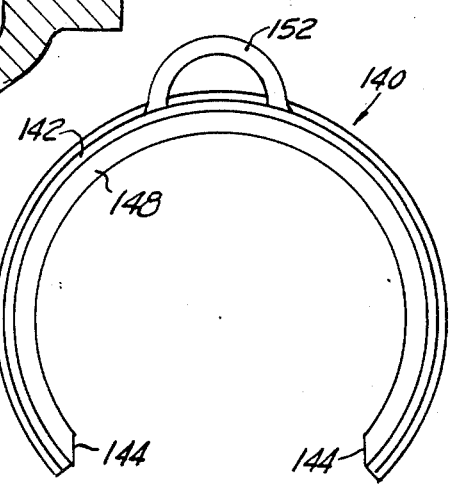
FIG. 6 is a front elevation view of the disposable assembly spacer shown at FIGS. 4—4.
Figure 5:
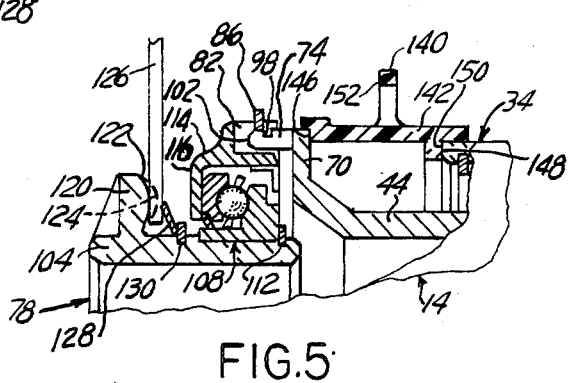

Prior to filling the hydraulic apparatus with hydraulic fluid, a disposable spacer 140, FIG. 6, is snapped over the slave cylinder piston sleeve 44, FIGS. 4-5, between the piston sleeve flange 70 and the end of the cylinder housing 34. The spacer 140 is in the form of a partial ring 142 having an open gap 144 clearing the periphery of the piston sleeve 44. The open ring 142 has an abutment shoulder 146 at one edge engageable with the edge of the piston sleeve flange 70 and an abutment shoulder 148 engageable with the end edge 150 of the slave cylinder housing 34. The spacer 140 may be provided with an integral ear or ring 152 to facilitate installation and removal.

The spacer 140 holds the piston sleeve 44 extended from the end of the slave cylinder housing 34 to an appropriate position against the tension of the return spring 68 during filling of the apparatus with hydraulic fluid, during shipment to the motor vehicle manufacturer and during coupling of the slave cylinder piston sleeve 44 with the bearing carrier 74 on the motor vehicle assembly line, preventing the piston sleeve 44 from being retracted within the cylinder chamber 40. When the bearing carrier 78 is coupled to the end of the slave cylinder piston sleeve 44 during assembly on the motor vehicle, the bearing carrier 78 and the slave cylinder are forcibly pushed toward each other, intermeshing the bearing carrier crenellated rim 80 with the crenellated rim 72 of the piston sleeve 44, thus resiliently expanding the resilient ring 86 outwardly while climbing over the ramp surface 102 at the edge of each tooth-like projecting portion 74 of the piston sleeve crenellated rim 72, FIGS. 4-5, the spacer 140 prevents the piston sleeve 44 from retracting within the slave cylinder 14. As previously mentioned, when the spring ring 86 is radially aligned with the groove 98, it snaps into the groove 98 on the periphery of the tooth-like projecting portions 74 of the piston sleeve crenellated rim 72 and, being engaged in the groove 100 in the bearing carrier crenellated rim 80, the spring ring 86 securely couples the bearing carrier 78 to the slave cylinder piston sleeve 44. After coupling of the bearing carrier 78 to the slave cylinder piston sleeve 44, the spacer 140 is removed and disposed of.

The connection between the master cylinder 12 and the slave cylinder 14 through the conduit 16 is preferably effected by way of the conduit 16 provided on one end with a leakproof quick-connect connector member 160, as disclosed in application Ser. Nos. 555,667, 607,020 and 680,329, for example, all assigned to the same assignee as the present application. This permits the whole apparatus, including the master cylinder 12, the slave cylinder 14 and the conduit 16 to be prefilled with hydraulic fluid prior to shipment to a motor vehicle manufacturer for installation in a motor vehicle on the assembly line, while allowing disconnecting the filled master cylinder 12 and conduit 16 from the filled slave cylinder 14.

An arrangement permitting to reconnect the master cylinder 12 to the slave cylinder 14, through the wall of the clutch bell housing 22, is illustrated at FIGS. 1 and 7, utilizing the intermediary of the connection block 18 installed in an opening 20 in the bell housing 22. The connection block 18 has a flange 162 engaged with the inner surface of the bell housing 22 around the opening 20 and a portion or neck 164 projecting beyond the outer surface of the bell housing. The projecting portion or neck 164 of the connection block 18 has two lateral grooves 166, one on each side, and the block 18 is held securely in position by means of a U-shaped spring clip 168 having a pair of undulated parallel legs 170 each resiliently and frictionally engaged in a lateral groove 170 for retaining the block 18 in position in the opening 20. The connection block 18 has a socket 172 in which is engaged the end of the leakproof quick-connect connector 160, the connector 160 being, when pressed into the socket 172, placed in direct fluid communication through a passageway 174 in the block 18 with a conventional connector 176 on one end of the conduit 16'. The other end of the conduit 16', extending within the bell housing 22, is provided with a conventional connector 176 placing the port, not shown, within the annular chamber 132, FIG. 2, of the slave cylinder 14 in direct fluid communication with the master cylinder 12. In the structure illustrated at FIG. 1, the slave cylinder 14 is also provided with a bleed port, not shown, placed in communication with the slave cylinder chamber 132 and connected through a conventional connector 176, a flexible conduit 178, and a further conventional connector 176 to a passageway 180 leading from the bottom of the block 18 to its top, the end of the passageway 180 being closed by a bleed valve 182. The bleed valve 182 permits to purge atmospheric air from the fully assembled apparatus comprising the master cylinder 12, the conduit 16, the connection block 18 and the slave cylinder 1 while the apparatus is being prefilled with hydraulic fluid, and permits replenishing of the apparatus with hydraulic fluid in the event of loss of hydraulic fluid in the field. After the apparatus has been fully purged of atmospheric air during filling with hydraulic fluid, the bleed valve 182 is screwed down shut. If the method used for filling the hydraulic apparatus with hydraulic fluid is the preferred method disclosed in the copending applications, consisting in evacuating the apparatus from atmospheric air by means of connecting to a filler port and to the hydraulic fluid reservoir a source of vacuum, prior to connecting the filler port with a source of hydraulic fluid, the bleed valve 182 may be used as one of the connections to the source of vacuum.

In the structure of FIGS. 8-10 the connection between the master cylinder 12 and the slave cylinder 14 through the wall of the housing 22 is effected by way of an individual leak-proof quick-connect connector socket 184 having a cylindrical body disposed in a circular opening 186 in the wall of the bell housing 22. The connector socket 184 is held in position in the opening 186 by a pair of spring clip rings 188, one disposed on the outside of the bell housing 22 in a groove 190 in the peripheral surface of the body of the connector socket 184 and the other disposed within the bell housing 22 in a similar groove 190. The connector socket 184 is preferably of the type disclosed in co-pending application Ser. Nos. 555,667, 607,020 and 680,329, and the quick-connect connector male member 160, on the end of the conduit 16, is a complementary connector, preferably also of the type disclosed in the co-pending applications, installed by pressing into the quick-connect connector socket 184. The quick-connect connector socket 184 is attached to the end of the flexible conduit 16'.

In a similar fashion, the flexible conduit 178 placing the bleed port of the slave cylinder 14 in communication with the bleed valve 182 is provided on its end with a cylindrical tubular fitting 192 installed in a circular opening 194 at some convenient location through the wall of the bell housing 22 and held in position in the opening 194 by means of a pair of spring snap rings 196 each disposed in one of a pair of corresponding grooves 198 in the peripheral surface of the fitting 192, one on the outside of the bell housing 22 and the other in the inside. The bleed valve 182 is installed on the end of the fitting 192 projecting from the bell housing 22. Preferably, the portion of the fitting 192 disposed in the opening 194 has a flat portion, not shown, engaged with a straight portion of the opening 194 such as to prevent the fitting 192 from rotating when the bleed valve 192 is open or closed. Alternatively, the fitting 192 may be provided with a square or hexagonal peripheral surface on its portion projecting from the bell housing 22, such as to permit holding the fitting 192 with a wrench while opening or closing the bleed valve 182.

It will be appreciated by those skilled in the art that the same structure permitting to couple the bearing carrier 78 to the free end of the slave cylinder piston sleeve 44 may be used for coupling a throw-out bearing carrier forming part of a pull clutch assembly with a clutch release sleeve mounted over a tubular member surrounding the driveshaft, in structure where the clutch release sleeve is directly mechanically operated by a fork in turn pivoted by the output member of a circularly cylindrical slave cylinder or by cables or levers directly actuated by the clutch control pedal.

Having thus described the present invention by way of examples of structure well designed to accomplish the objects of the invention, modifications whereof will be apparent to those skilled in the art, what is claimed as new is as follows:

1. A clutch control apparatus for a clutch having release fingers, said apparatus comprising a release bearing sub-assembly forming part of the clutch and a separate hydraulic cylinder sub-assembly forming part of a clutch release mechanism, said release bearing sub-assembly comprising a bearing carrier having first and second axially spaced ends, a bearing having a first race fitted to said first end of said bearing carrier and a second race, an outwardly extending flange at said second end of said carrier, said flange having a surface in engagement with the end of said fingers for releasing said clutch, means for holding the ends of said fingers in engagement with said flange surface, a housing for said bearing comprising a radially extending flange portion engaged with the second race of said bearing and a peripheral crenellated rim having axially projecting portions and cut-out portions between consecutive projecting portions, said hydraulic cylinder sub-assembly comprising a fixed annular member and a movable annular member positioned coaxially with respect to said fixed annular member and having a first end thereof sealingly engaging said fixed annular member and having a crenellated rim at its other, free end provided with alternating projecting and cut-out portions, and means operative in response to relative axial movement between said free end of said movable annular member and said bearing housing to couple said crenellated rims with said projecting portions of one of said rims fully introduced into the cut-out portions of the other of said crenellated rims.

2. The apparatus of claim 1 wherein said coupling means comprises a resilient expandable ring disposed in a peripheral groove in one of said crenellated rims and in a corresponding peripheral groove in the other of said crenellated rims.

3. The apparatus of claim 2 wherein the projecting portions of one of said crenellated rims have each a leading edge forming a ramp for expanding said ring for allowing said projecting portions to pass within said ring during coupling of said first and second sub-assemblies.

4. The apparatus of claim 2 further comprising a removable disposable assembly spacer having an end in engagement with an abutment surface on said movable annular member and another end engaged with said fixed annular member for preventing motion of said movable annular member during coupling of said crenellated rims.

5. The apparatus of claim 3 further comprising a removable disposable assembly spacer having an end in engagement with an abutment surface on said movable annular member and another end engaged with said fixed annular member for preventing motion of said movable annular member during coupling of said crenellated rims.

6. The apparatus of claim 1 wherein the surface of said carrier flange engaged with the ends of said fingers has curved recesses in each of which the end of a respective one of said fingers is engaged.

7. The apparatus of claim 2 wherein the surface of said carrier flange engaged with the ends of said fingers has curved recesses in each of which the end of a respective one of said fingers is engaged.

8. The apparatus of claim 3 wherein the surface of said carrier flange engaged with the ends of said fingers has curved recesses in each of which the end of a respective one of said fingers is engaged.

9. The apparatus of claim 4 wherein the surface of said carrier flange engaged with the end of said fingers has curved recesses in each of which the end of a respective one of said fingers is engaged.

10. The apparatus of claim 5 wherein the surface of said carrier flange engaged with the end of said fingers has curved recesses in each of which the end of a respective one of said fingers are engaged.

11. The apparatus of claim 6 wherein the means holding the ends of said fingers in engagement with said curved recesses is a dish spring.

12. The apparatus of claim 1 wherein said fixed annular member comprises an annular hydraulic cylinder having an open end and said movable annular member comprises an annular piston received within said open end of said annular cylinder and reciprocable within said annular cylinder.

13. The apparatus of claim 2 wherein said fixed annular member comprises an annular hydraulic cylinder having an open end and said movable annular member comprises an annular piston received within said open end of said cylinder and reciprocable within said annular cylinder.

14. The apparatus of claim 3 wherein said fixed annular member comprises an annular hydraulic cylinder having an open end and said movable annular member comprises an annular piston received within said open end of said annular cylinder and reciprocable within said annular cylinder.

15. The apparatus of claim 4 wherein said fixed annular member comprises an annular hydraulic cylinder having an open end and said movable annular comprises an annular piston received within said open end of said annular cylinder and reciprocable within said annular cylinder.

16. The apparatus of claim 1 further comprising means preventing rotation of said movable annular member.

17. The apparatus of claim 12 further comprising means preventing rotation of said movable annular member.

18. The apparatus of claim 12 further comprising sealing means defining an annular chamber between said annular cylinder and said annular piston, and means for supplying hydraulic fluid to said chamber.

19. The apparatus of claim 18 wherein said means for supplying hydraulic fluid to said chamber is a conduit, and further comprising a master cylinder connected to said chamber via said conduit.

20. The apparatus of claim 19 wherein said clutch has a housing defining a housing wall and said annular cylinder is installed within said housing, and further comprising connection means mounted through said housing wall, a first conduit connecting said master cylinder to said connection means and a second conduit in said housing connecting said chamber to said connection means, said connection means placing said first and second conduits in fluid communication.

21. The apparatus of claim 20 further comprising second connection means mounted through said housing wall, a third conduit disposed within said housing connecting said chamber to said second connection means, a bleed valve on an end of said second connection means and a passageway within said second connection means placing said third conduit and said bleed valve in fluid communication.

22. The apparatus of claim 20 wherein said connection means comprises a block having a neck portion disposed through an opening in said housing wall, a flange on said connection block below said neck portion in engagement with an internal surface area of said housing surrounding said opening, a pair of lateral grooves in said neck portion, and a U-shaped spring clip having legs engaged in said lateral grooves for holding said block by resilient and frictional engagement of said clip with an exterior surface area of said housing proximate said spring.

23. The apparatus of claim 21 wherein said first mentioned connection means and said second connection means comprise a single block having a neck portion disposed through an opening in said housing wall, a flange on said connection block below said neck portion and in engagement with an internal surface area of said housing surrounding said opening, a pair of lateral grooves in said neck portion and a U-shaped spring clip having legs engaged in said lateral grooves for holding said block by resilient and frictional engagement of said clip with an exterior surface area of said housing proximate said spring.

24. The apparatus of claim 20 wherein said connection means comprises a leak-proof quick-connector disposed through an opening in said housing wall, spring clip means holding said connector in position in said opening, said first conduit having a leak-proof quick-connect complementary connector coupled therewith for placing said first and second conduits in fluid communication.

25. The apparatus of claim 24 further comprising a second opening in said housing wall, a fitting disposed through said second opening, means for holding said fitting in said second opening, a bleed valve on the end of said fitting projecting on the outside of said housing, and a third conduit within said housing, said fitting placing said chamber in communication with said bleed valve via said third conduit and said fitting.

* * * * *